United States Patent
Zhao et al.

(10) Patent No.: US 11,258,209 B2
(45) Date of Patent: Feb. 22, 2022

(54) SEALED ELECTRICAL PLUG WITH TEMPERATURE SENSORS

(71) Applicant: Volex Cable Assembly (Shenzhen) Co., Ltd., Shenzhen (CN)

(72) Inventors: ChangChun Zhao, Shenzhen (CN); Mui Lian Jessica Toh, Singapore (SG); Yuanwen Mo, Singapore (SG)

(73) Assignee: VOLEX CABLE ASSEMBLY (SHENZHEN) CO., LTD., Shenzhen (CN)

( * ) Notice: Subject to any disclaimer, the term of this patent is extended or adjusted under 35 U.S.C. 154(b) by 0 days.

(21) Appl. No.: 16/327,222

(22) PCT Filed: Feb. 1, 2019

(86) PCT No.: PCT/CN2019/074382
§ 371 (c)(1),
(2) Date: Feb. 21, 2019

(87) PCT Pub. No.: WO2020/124755
PCT Pub. Date: Jun. 25, 2020

(65) Prior Publication Data
US 2021/0336393 A1    Oct. 28, 2021

(30) Foreign Application Priority Data
Dec. 21, 2018    (CN) .......................... 201811571707.2

(51) Int. Cl.
*H01R 13/66* (2006.01)
*G01K 1/14* (2021.01)
(Continued)

(52) U.S. Cl.
CPC ........... *H01R 13/6683* (2013.01); *G01K 1/14* (2013.01); *G01K 7/24* (2013.01); *H01R 13/504* (2013.01);
(Continued)

(58) Field of Classification Search
CPC .... H01R 13/66; H01R 13/6616; H01R 13/68; H01R 13/696; H01R 13/6683; H01R 13/504; H01R 13/5205; H01R 13/521
See application file for complete search history.

(56) References Cited

U.S. PATENT DOCUMENTS

| 4,797,007 A | 1/1989 | Elmore, III |
| 4,854,894 A * | 8/1989 | Harrell ................... H01R 43/24 439/606 |

(Continued)

FOREIGN PATENT DOCUMENTS

| CN | 201522882 U | 7/2010 |
| CN | 103682855 A | 3/2014 |

(Continued)

OTHER PUBLICATIONS

European Patent Application No. 19703233.7; Extended Search Report; dated Nov. 24, 2020; 13 pages.

(Continued)

*Primary Examiner* — Vanessa Girardi
(74) *Attorney, Agent, or Firm* — BakerHostetler

(57) ABSTRACT

A sealed electrical plug comprises at least one temperature sensor for monitoring an internal temperature of the electrical plug. The electrical plug further comprises a data cable that is wrapped by a shield for screening electrical noise so as to accurately capture and convey temperature data. The electrical plug further comprises a housing or holder for receiving the at least one temperature sensor, wherein the housing is capable of being embedded within an inner-mold of the electrical plug and positioned close to at least one pin. One or more seals may be placed at junctions between the at least one pin and the inner-mold and a cable for the data cable to seal the inner-mold from air, moisture and particles.

19 Claims, 14 Drawing Sheets

(51) Int. Cl.
  *G01K 7/24* (2006.01)
  *H01R 13/504* (2006.01)
  *H01R 13/52* (2006.01)

(52) U.S. Cl.
  CPC ....... *H01R 13/521* (2013.01); *H01R 13/5205* (2013.01)

(56) References Cited

U.S. PATENT DOCUMENTS

| | | |
|---|---|---|
| 5,188,542 A | 2/1993 | Ballman |
| 5,362,249 A | 11/1994 | Carter |
| 5,662,484 A | 9/1997 | Blanche |
| 5,749,656 A | 5/1998 | Boehm et al. |
| 6,419,505 B1 | 7/2002 | Waible |
| 6,588,931 B2 | 7/2003 | Betzner et al. |
| 6,802,741 B1 | 10/2004 | Shatkin |
| 6,910,920 B2 | 6/2005 | Su |
| 7,140,897 B2 | 11/2006 | Axenbock et al. |
| 7,666,033 B1 | 2/2010 | Fung |
| 7,677,916 B2 | 3/2010 | Chang |
| 8,029,318 B2 | 10/2011 | Namiki et al. |
| 8,277,250 B2 | 10/2012 | Suzuki et al. |
| 9,373,918 B2 | 6/2016 | Kawai et al. |
| 9,634,438 B2 * | 4/2017 | Chaumeny ............... G01K 1/14 |
| 9,780,501 B2 * | 10/2017 | Wu ...................... H01R 13/504 |
| 10,224,678 B2 * | 3/2019 | Chen .................. H01R 13/6608 |
| 2004/0008532 A1 | 1/2004 | Asawa |
| 2004/0018780 A1 | 1/2004 | Mott et al. |
| 2004/0145446 A1 | 7/2004 | Chou |
| 2005/0024877 A1 | 2/2005 | Frederick |
| 2005/0197010 A1 | 9/2005 | Ching |
| 2009/0068893 A1 | 3/2009 | Busse et al. |
| 2015/0171568 A1 | 6/2015 | Kawamoto et al. |
| 2016/0104978 A1 | 4/2016 | Chaumeny et al. |
| 2016/0126681 A1 | 5/2016 | Kawai et al. |
| 2018/0366870 A1 | 12/2018 | Miyazawa et al. |

FOREIGN PATENT DOCUMENTS

| | | |
|---|---|---|
| CN | 203553507 U | 4/2014 |
| CN | 205657246 U | 10/2016 |
| CN | 107112698 A | 8/2017 |
| DE | 8633492 U1 | 2/1987 |
| DE | 102007042589 A1 | 3/2009 |
| EP | 1498991 B1 | 1/2008 |
| EP | 2034561 A1 | 3/2009 |
| FR | 2172836 A | 10/1973 |
| JP | 2002-352635 A | 12/2002 |
| JP | 4031026 B1 | 1/2008 |
| WO | WO 2016/081909 A1 | 5/2016 |

OTHER PUBLICATIONS

International Patent Application No. PCT/US2015/062001; Int'l Search Report and the Written Opinion dated Feb. 4, 2016; 13 pages.

International Patent Application No. PCT/US2015/062001; Int'l Preliminary Report on Patentability; dated Apr. 14, 2017; 16 pages.

International Patent Application No. PCT/CN2019/074382; Written Opinion; dated Sep. 19, 2019; 5 pages.

\* cited by examiner

SEALED ELECTRICAL PLUG WITH TEMPERATURE SENSORS

TECHNICAL FIELD

The present disclosure relates to an electrical connector, and more particularly to a sealed electrical plug including one or more temperature sensors.

BACKGROUND

Electrical plugs are commonly used to supply power to electrical appliances, such as electric toasters and kettles, electrical vehicle charging devices, some of which draw more current than other powered devices. Conventional electrical plugs typically do not include protective mechanisms for higher current draw applications and may be subject to overheating, melting, or burning. As a result, conventional electrical plugs may become damaged and may cause unsafe conditions. Furthermore, in certain environments, electrical plugs may be exposed to air and moisture that can enter the plug and result in additional damage and unsafe conditions. There is thus a need for improvements to conventional electrical plugs.

SUMMARY

In accordance with an aspect of the present disclosure, there is provided an electrical plug which comprises at least one temperature sensor embedded in the plug for detecting temperature inside of the plug. The electrical plug further comprises a data cable wrapped by a shield for screening electric noise so as to accurately capture and convey the temperature data from the at least one temperature sensor. The electrical plug further comprises a housing for containing the at least one temperature sensor.

The electrical plug may comprise two thermistors, wherein one thermistor may be disposed adjacent to a live pin of the plug and another thermistor may be disposed adjacent to a neutral pin of the plug. The housing for containing the thermistors may include at least one snap joint for removably locking a cover portion and a base portion of the housing together. The electrical plug may further comprise a snap-fit mechanism for removably attaching the housing to a pin bridge of the plug.

Alternatively, the housing for containing thermistors may comprise a ceramic housing which may include two pin receptacles and two thermistor receptacles, wherein the two pin receptacles and the two thermistor receptacles may be arranged in a line and the two thermistor receptacles may be disposed between the pair of pin receptacles. A thermally conductive adhesive may be filled into the gap between the thermistor receptacles and their respective thermistors so as to maintain a tight contact and to reduce thermal resistivity, thereby ensuring stable performance of the thermistors during a predicted life time. In addition, the pins (also known as terminals and prongs) of the electrical plug may be sealed within a pin bridge of an inner-mold of the electrical plug to prevent air and moisture from entering the electrical plug, thereby preventing damage to the interior of the electrical plug, preventing shorts, and protecting the thermistors.

In accordance with a second aspect of the present disclosure, there may be provided a method of assembling an electrical plug which comprises the steps of inserting at least one temperature sensor into a housing and embedding the housing containing the at least one temperature sensor in the plug. The method further comprises the steps of forming an inner mold around the housing containing the at least one temperature sensor, sealing the pins within the inner-mold, and forming an over-mold over the inner-mold.

BRIEF DESCRIPTION OF THE DRAWINGS

Embodiments of the present disclosure will be described more fully hereinafter with reference to the accompanying drawings, in which.

DETAILED DESCRIPTION OF ILLUSTRATIVE EMBODIMENTS

The present disclosure describes an improved electrical plug that is capable of accurately monitoring temperature of the electrical plug and conveying temperature data to a controller. Once the temperature of the electrical plug passes a predetermined threshold, the plug is configured to automatically cut off an electric circuit so as to avoid damaging the electrical plug and creating unsafe conditions.

While embodiments of type B plugs used in North America are illustrated in the figures and described herein, it is to be understood that the present disclosure is not limited to type B plugs. As noted, electrical plugs in the present disclosure can be plugs of any voltage standard as well as plugs supporting two or more voltage standards. The electrical plugs can be any shape, size, and type, such as type A and C-N.

Figure 1:
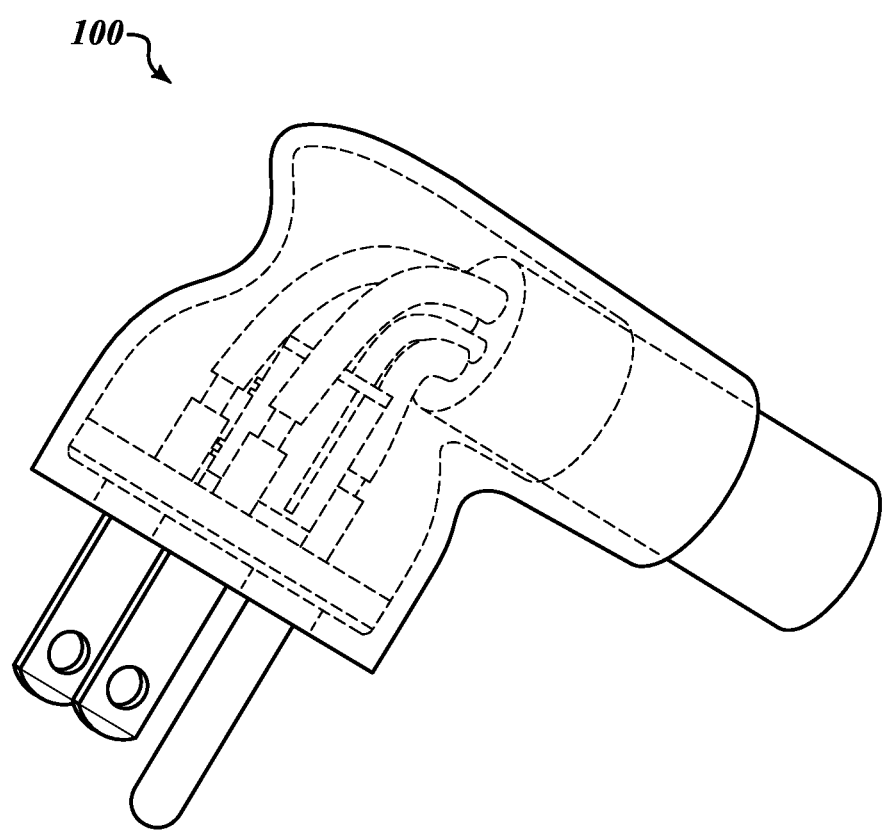
FIG. 1 illustrates a partially translucent electrical plug including thermistors in accordance with the present disclosure.
Figure 2:
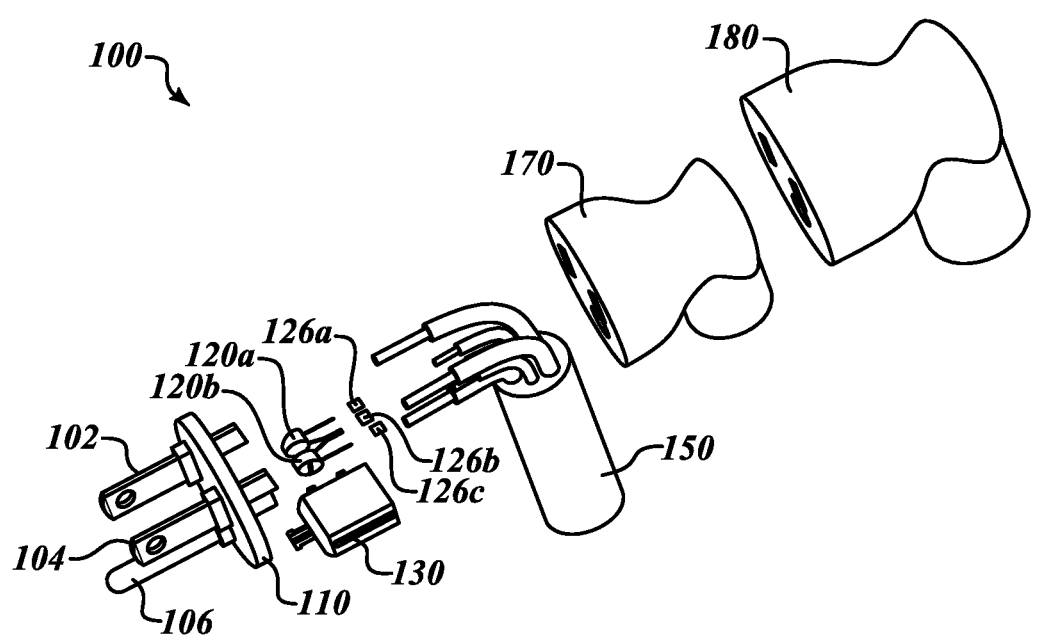
FIG. 2 is an exploded perspective view of an electrical plug including thermistors in accordance with the present disclosure.

FIG. 1 illustrates an embodiment of a fully assembled electrical plug 100 according to the present disclosure, with a translucent inner-mold 170 and over-mold 180 (as shown in FIG. 2) so the internal components are visible. As shown more particularly in FIG. 2, the electrical plug 100 may include a live pin 102, a neutral pin 104 and an earth pin 106, which as noted above are also referred to in the art as terminals and prongs. The pins 102, 104 and 106 may be assembled in a pin bridge 110. The electrical plug 100 may also include thermistors 120a and 120b (collectively 120), fastening members 126a, 126b, and 126c (collectively 126), a housing 130, a cable 150, an inner-mold 170, and an over-mold 180. The pins 102, 104, 106 may be made of any suitable electrically conductive materials, such as copper or brass. The pins 102, 104, and 106 may be electrically coupled to their respective conductors in the cable 150. The pins 102, 104, and 106 may be fixed in the pin bridge 110. The pin bridge 110 may be made of any suitable insulation materials, such as plastic.

Figure 3:
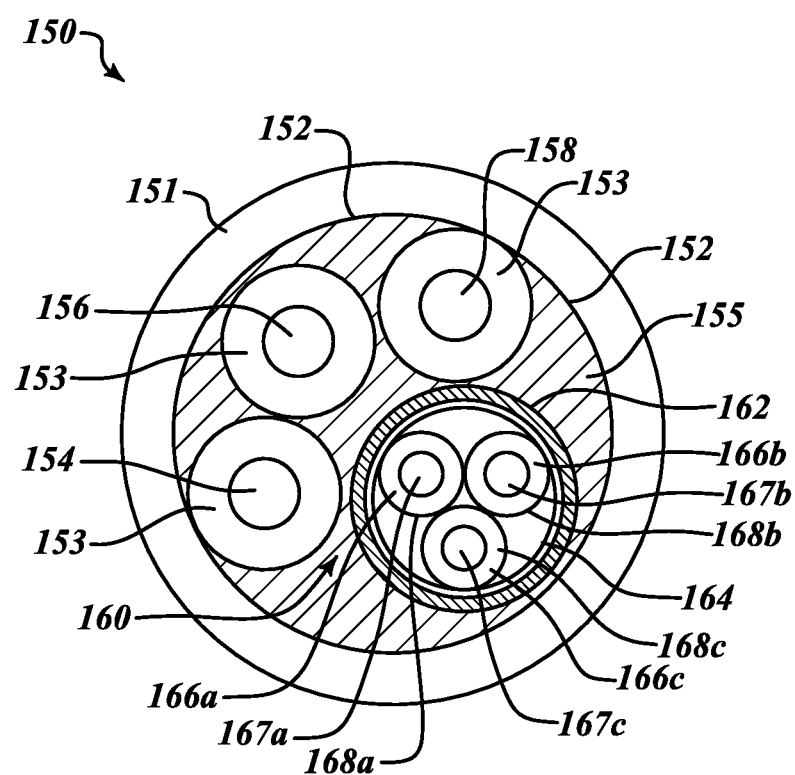
FIG. 3 is a cross-sectional view of a cable in accordance with the present disclosure.

The thermistors 120a and 120b may be coupled to a data section 160 of the cable 150 (as shown in FIG. 3) so as to accurately convey temperature data to a temperature controller installed in an electrical appliance (not shown). The fastening members 126 may be used to fasten electrodes of the thermistors 120 to corresponding data cords of the data section 160. The thermistors 120 may be of any type of thermistors, such as bead thermistors and disc thermistors. The thermistors 120 may be received in the housing 130 which can be embedded in the plug 100. The housing 130 may be removably attached to the pin bridge 110. The features of the housing 130 will be further described below.

While thermistors 120 are illustrated in the drawings and described herein, it should be appreciated that the illustrated thermistors 120 are not limiting in any way. The present disclosure is not limited to the use of thermistors and other suitable temperature sensors may be used, such as integrated circuit chips on a printed circuit board assembly, or any electrical and/or electronic components with certain precision. Likewise, it should be understood that the number of the thermistors 120 is not limited to two and may be any other number, such as one and three.

FIG. 3 depicts a cross-sectional view of the cable 150 according to an exemplary embodiment of the present disclosure. The cable 150 may include a jacket 151, a first sheath 152, a power section comprising three wires 153 with conductors 154, 156 and 158, and the data section 160. The wires 153 of the power section and the data section 160 may be enclosed within the first sheath 152. The jacket 151 may be wrapped around the first sheath 152. The jacket 151 and the first sheath 152 may be made of any suitable insulating materials, such as plastic. The conductors 154, 156, and 158 may be coupled to the pins 102, 104, and 106, respectively, so as to transmit electrical power. Each of the conductors 154, 156, or 158 may be surrounded by a layer of insulating material. Fillers 155 may be disposed within the cable 150 so as to fill gaps among the insulating layers of the conductors 154, 156, 158, and the data section 160, thereby maintaining their respective positions relative to each other and adding strength to the cable 150. The fillers 155 may be any type, such as plastic filler and paper filler.

It is noted that the power section wires 153 described herein are not limiting in any way. The power section wires 153 may have any suitable structure and arrangement corresponding to a specific type of electrical plug. For instance, when the plug 100 is a type A plug which is an ungrounded plug with two flat parallel pins, the power section wires 153 of the cable 150 may include only two conductors for being electrically coupled to the two pins of the type A plug, respectively.

As illustrated in FIG. 3, the data section 160 may include a shield 162, a second sheath 164, a first data cord 166a, a second data cord 166b, and a third data cord 166c (collectively data cords 166). The data cord 166a, 166b, and 166c may comprise a conductor 167a, 167b, and 167c, respectively. The conductor 167a, 167b, and 167c may be surrounded by a corresponding insulation layer 168a, 168b, and 168c. The data cords 166 may be coupled to the electrodes of the thermistors 120 so as to convey temperature data from the thermistors 120 to a temperature controller. By way of example and without limitation, the temperature controller may be installed in an electrical appliance (not shown). It should be appreciated that the number of the data conductors described herein is not limiting in any way. The number of the data conductors may vary corresponding to the number of temperature sensors embedded in the electrical plug 100.

The data cords 166 may be enclosed within the second sheath 164. The shield 162 may be wrapped outside the second sheath 164. The shield 162 may be made of copper or other conductive materials. The shield 162 may screen electrical noise from the power section 153 and prevent electrical noise from interfering with the temperature data signal, thereby enabling the data section 160 to accurately convey temperature data. The shield 162 may be composed of braided strands of copper or other metal, a non-braided spiral winding of copper tape, or a layer of a conducting polymer.

Figure 4A:
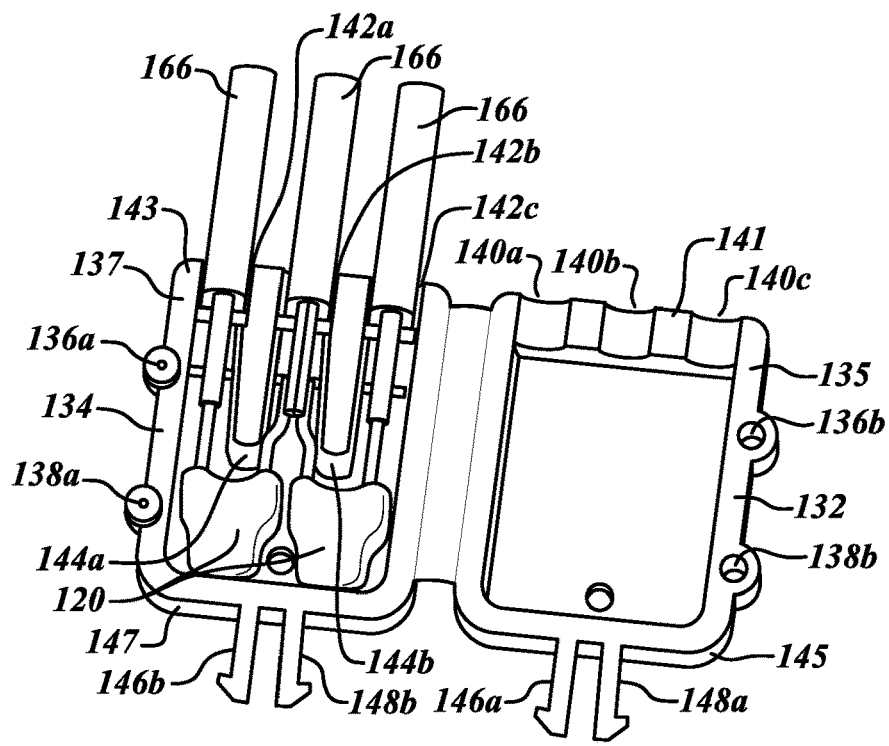
FIGS. 4A and 4B are perspective views of a housing containing thermistors according to an embodiment of the present disclosure.
Figure 4B:
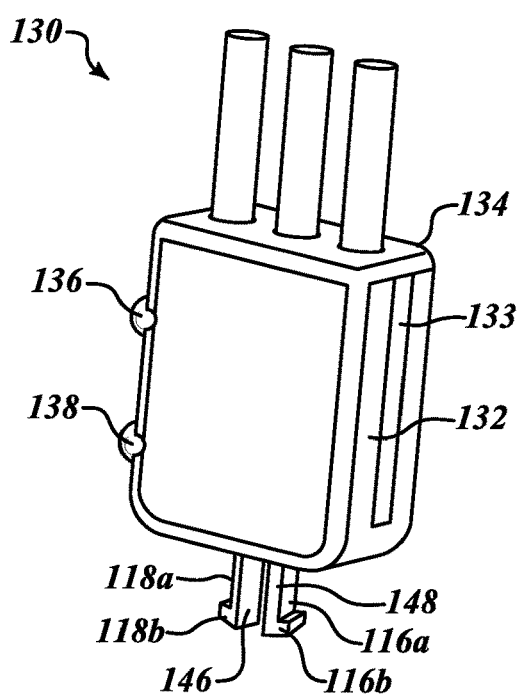

FIGS. 4A and 4B illustrate an exemplary embodiment of the housing 130 for containing the thermistors 120. The housing 130 may be made of any insulating materials with a given level of flexibility, such as plastic. By way of example and without limitation, the housing 130 may be manufactured by using a plastic injection molding process. The housing 130 includes a cover portion 132, a hinge portion 133, and a base portion 134. The cover portion 132 and the base portion 134 may rotate around the hinge portion 133 so as to close or open the housing 130. The cover portion 132 comprises four side walls and a central recess. Likewise, the base portion 134 includes four side walls and a central recess. The central recesses of the cover portion 132 and the base portion 134 may be used to receive the thermistors 120 and the data cords 166.

A first snap joint 136 and a second snap joint 138 may be formed on the side wall 135 of the cover portion 132 and the side wall 137 of the base portions 134. The first snap joint 136 comprises a first protruding part 136a and a first receptacle 136b. The second snap joint 138 includes a second protruding part 138a and a second receptacle 138b. The first and second protruding parts 136a and 138a are positioned and configured so as to catch in the first and second receptacles 136b and 138b, respectively, thereby latching the cover portion 132 and the base portion 134 together when the housing 130 is closed. When the housing 130 is desired to be opened, a user may apply a force to the snap joints 136 and 138 which causes the protruding parts 136a and 138a to separate from the receptacles 136b and 138b, respectively.

In the embodiment illustrated in FIGS. 4A and 4B, the protruding parts 136a and 138a are provided on the side wall 137 of the base portion 134 and their corresponding receptacles 136b and 138b are formed on the side wall 135 of the cover portion 132. In another embodiment, the protruding parts 136a and 138a may be formed on the cover portion 132, and the corresponding receptacle 136b and 138b may be provided on the base portion 134.

While the snap joints 136 and 138 are described herein, the illustrated embodiment is not limiting in any way. It should be understood that the number of snap joints is not limited to two, and the numbers may vary, such as one or three. Also, it should be appreciated that snap joints are merely illustrative and that any other suitable affixing structure may be used for joining the cover portion 132 and the base portion 134 together in accordance with the present disclosure.

As illustrated in FIG. 4A, the cover portion 132 includes three channels 140a, 140b, and 140c which may be formed on the back side wall 141 of the cover portion 132. The base portion 134 includes three channels 142a, 142b and 142c which may be formed on the back side wall 143 of the base portion 134. The channels 140a, 140b, and 140c of the cover portion 132 and the channels 142a, 142b and 142c of the base portion 134 may be symmetrically provided on the back side walls 141 and 143 such that three approximately round channels can be formed so as to receive the data cords 166 when the housing 130 is closed.

Two partition walls 144a and 144b (collectively 144) may be formed in central recess of the base portion 134 between channels 142a and 142b and between channels 142b and 142c and extend upward and perpendicular to the inner bottom surface of the central recess of the base portion 134. The height of the partition walls 144 may be equal to or less than a total of the depth of the central recesses of the cover portion 132 and the base portion 134 so that the cover portion 132 and the base portion 134 can fit together so as to completely close the housing 130. The back ends of the partition walls 144 may be perpendicularly attached to the inner surface of the back side wall 143. The partition walls 144 may be positioned and configured so as to approximately evenly divide the back area of the central recess of the base portion 134 into three subareas so as to receive the three data cords 166a, 166b, and 166c, respectively.

A first cantilever 146 and a second cantilever 148 may be symmetrically formed on the outside surface of the front end of the housing 130 around the vertical and horizontal centerlines of the outside surface of the front end of the housing 130. Two halves 146a and 146b of the first cantilevers 146 may extend outward and perpendicular to the outside surface of the front side wall 145 of the cover portion 132 and the outside surface of the front side wall 147 of the base portion 134, respectively. Likewise, two halves 148a and 148b of the second cantilevers 148 may extend outward and perpendicular to the outside surface of the front side wall 145 of the cover portion 132 and the outside surface of the front side wall 147 of the base portion 134, respectively.

Figure 5A:
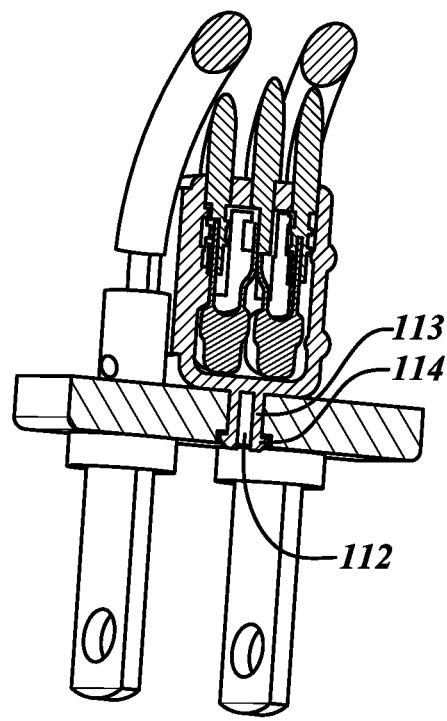
FIGS. 5A and 5B are perspective views of showing a snap-fit mechanism for removably attaching a housing to a pin bridge according to an embodiment of the present disclosure.
Figure 5B:
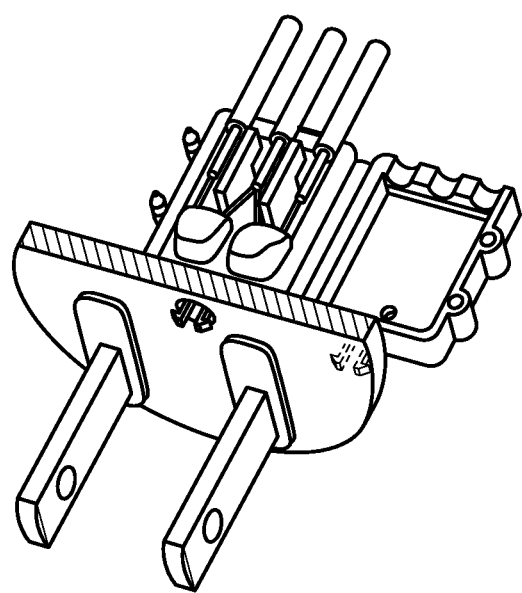

The first cantilever 146 may include a first arm 118a and a first hook 118b which may be formed at the distal end of the first arm 118a. Likewise, the second cantilever 148 may include a second arm 116a and a second hook 116b which is formed at the distal end of the second arm 116a. The pair of cantilevers 146 and 148 may be configured so as to fit into a third receptacle 112 (as shown in FIGS. 5A and 5B) formed in the pin bridge 110, thereby removably attaching the housing 130 to the pin bridge 110. When the housing 130 is desired to be detached from the pin bridge 110, a user may apply an inwardly directed force to the hooks 116b and 118b which can cause the cantilevers 148 and 146 to disengage from the third receptacle 112.

Although FIGS. 4A and 4B depict an exemplary embodiment of a housing for containing temperature sensors embedded in an electrical plug 100, those of ordinary skill in the art will appreciate that in other embodiments the depicted example may be modified. For instance, it should be appreciated that the use of the cantilevers 146 and 148 for connecting the housing 130 to the pin bridge 110 is merely illustrative and that any other suitable arrangement may be used to attach the housing 130 to the pin bridge 110, such as use of adhesive, which may have the added benefit of removing the need for the cantilevers 146 and 148 and the third receptacle 112. It also should be understood that the housing is not limited to two thermistors, and that the housing may be modified to contain one, three, four, or more thermistors.

As shown more particularly in FIGS. 5A and 5B, the third receptacle 112 may be disposed such that the housing 130 is positioned among the three pins 102, 104, and 106 when the housing 130 is attached to the pin bridge 110. Preferably, the third receptacle 112 may be disposed approximately at the center of the pin bridge 110. In another embodiment in which the plug 100 is a type A plug that has only two pins, the third receptacle 112 may be disposed such that the housing 130 is positioned slightly below or above the two pins in a vertical direction and approximately centrally between the two pins in a horizontal direction. As illustrated more particularly in FIG. 5A, the third receptacle 112 may be a stepped slit and include a narrow portion 113 and a broad portion 114. The narrow portion 113 may be configured so as to receive the first and second arms 118a and 116a. The broad portion 114 may be configured so as to receive the first and second hooks 118b and 116b. The width of the broad portion 114 may be larger than the width of the narrow portion 112. As the third receptacle 112 will be covered by the over-mold 180, any remaining opening through the pin bridge 110 at the third receptacle 112 will be sealed by the material of the over-mold 180.

Figure 6A:
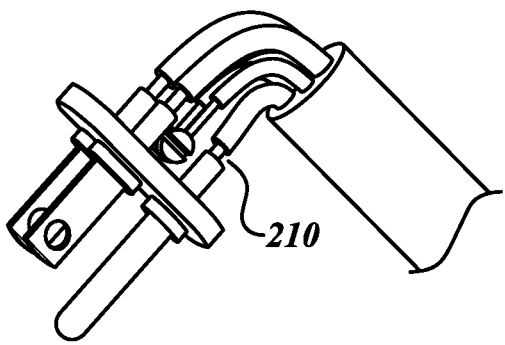
FIGS. 6A, 6B, 6C and 6D illustrate a process of assembling an electrical plug including thermistors in accordance with an embodiment of the present disclosure.
Figure 6B:
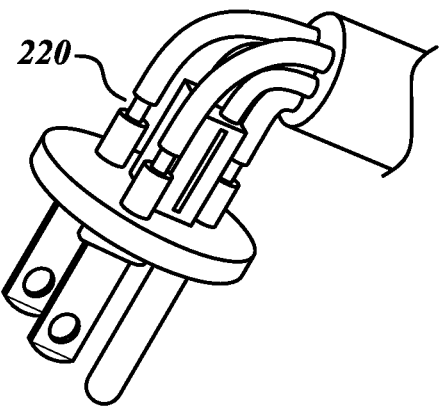
Figure 6C:
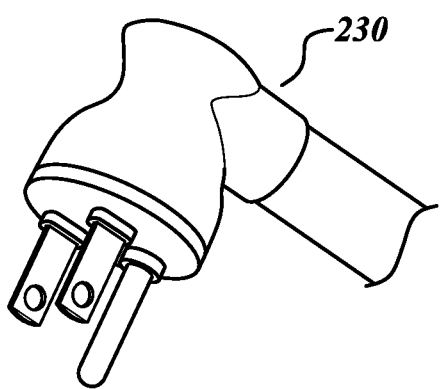
Figure 6D:
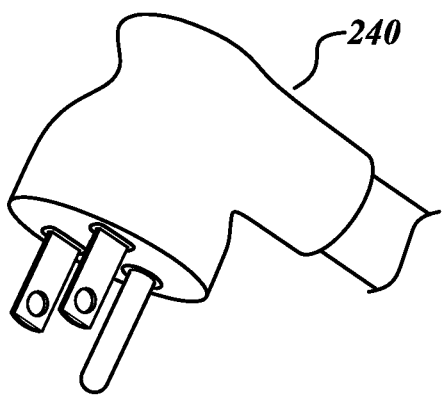

FIGS. 6A and -6D illustrate a process of assembling the electrical plug 100 according to an exemplary embodiment of the present disclosure. The assembling process may include a first step 210 of connecting electrodes of the thermistors 120 to corresponding data cords of the data section 160 by using the fastening members 126, and connecting the pins 102, 104, and 106 to corresponding conductors of the power section 153. The assembling process may include a second step 220 of installing the thermistors 120 into the housing 130, and removably attaching the housing 130 to the pin bridge 110 by fitting the pair of cantilevers 146 and 148 into the third receptacle 112. The assembling process may include a third step 230 of forming the inner-mold 170 over a portion of pins 102, 104, and 106 connected to the cable 150, the portion including the housing 130 containing the thermistors 120 connected to the data section 160 of the cable 150 and matching up to the pin bridge 110. The assembling process may further include a fourth step 240 of forming the over-mold 180 over the inner-mold 170, pin bridge 110 and a portion of the cable 150. Those of ordinary skill in the art will appreciate that any suitable means may be used to form the inner-mold 170 over the connecting portion and forming the over-mold 180 over the inner-mold 170.

Figure 7:
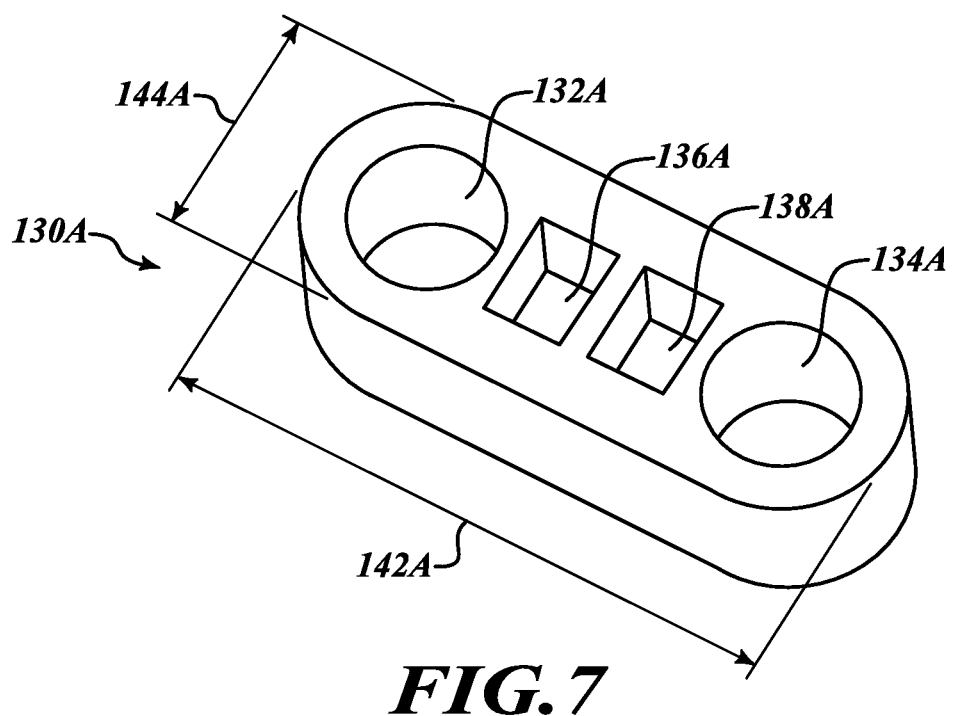
FIG. 7 is a perspective view of a thermal conductive housing such as Ceramic for containing thermistors according to another embodiment of the present disclosure.

FIG. 7 illustrates a second exemplary embodiment of a housing 130A for containing thermistors. Preferably, the housing 130A may be made of ceramic. The ceramic may be a highly thermally conductive ceramic, such as aluminum nitride, silicon carbon, and aluminum oxide. Other thermally conductive ceramics include beryllium oxide and boron nitride, among others. In an embodiment, the highly thermally conductive ceramic housing 130A is positioned near the pins 102 and 104 to assist in heat sensing by the thermistors. For example, a closely positioned thermistor, as discussed herein, may sense heat and send a data signal to a control system external to the electrical plug, such that power draw from an electrical appliance will be cut off when the sensed temperature reaches a pre-set temperature.

Alternatively, the housing 130A may be made of any other suitable electrically insulating materials with high thermal conductive properties. The housing 130A may have an elongated shape, such as an oblong oval and an oblong rectangle. The housing 130A has a certain thickness 140A (shown in FIG. 8), a certain length 142A, and a certain width 144A so as to provide receptacles for receiving the pins 102 and 104 and one or more thermistors 120 and so as to be capable of being embedded in the electrical plug 100.

As shown in FIG. 7, the housing 130A includes a pair of pin receptacles 132A and 134A and a pair of thermistor receptacles 136A and 138A. The pair of pin receptacles 132A and 134A and the pair of thermistor receptacles 136A and 138A may be arranged in a line. The pair of pin receptacles 132A and 134A may be positioned and configured so as to receive the back ends of the live pin 102 and the neutral pin 104, respectively. The pair of pin receptacles 132A and 134A may be disposed adjacent to the two ends of the housing 130A. The pair of pin receptacles 132A and 134A may have the shape of a cylinder or any other suitable shape so as to receive the back ends of the live pin 102 and the neutral pin 104.

The pair of thermistor receptacles 136A and 138A may be positioned and configured so as to receive two thermistors 120, respectively. The pair of thermistor receptacles 136A and 138A may be positioned at the central portion of the housing 130A and between the pair of pin receptacles 132A and 134A. The pair of thermistor receptacles 136A and 138A may have the shape of a cube or any other suitable shape so as to receive the thermistors 120. Although FIG. 7 depicts an exemplary embodiment, those of ordinary skill in the art will appreciate that various embodiments may modify the depicted example. For instance, the number of thermistor receptacles is not limited to two, and it may be any other number, such as one or three.

Figure 8:
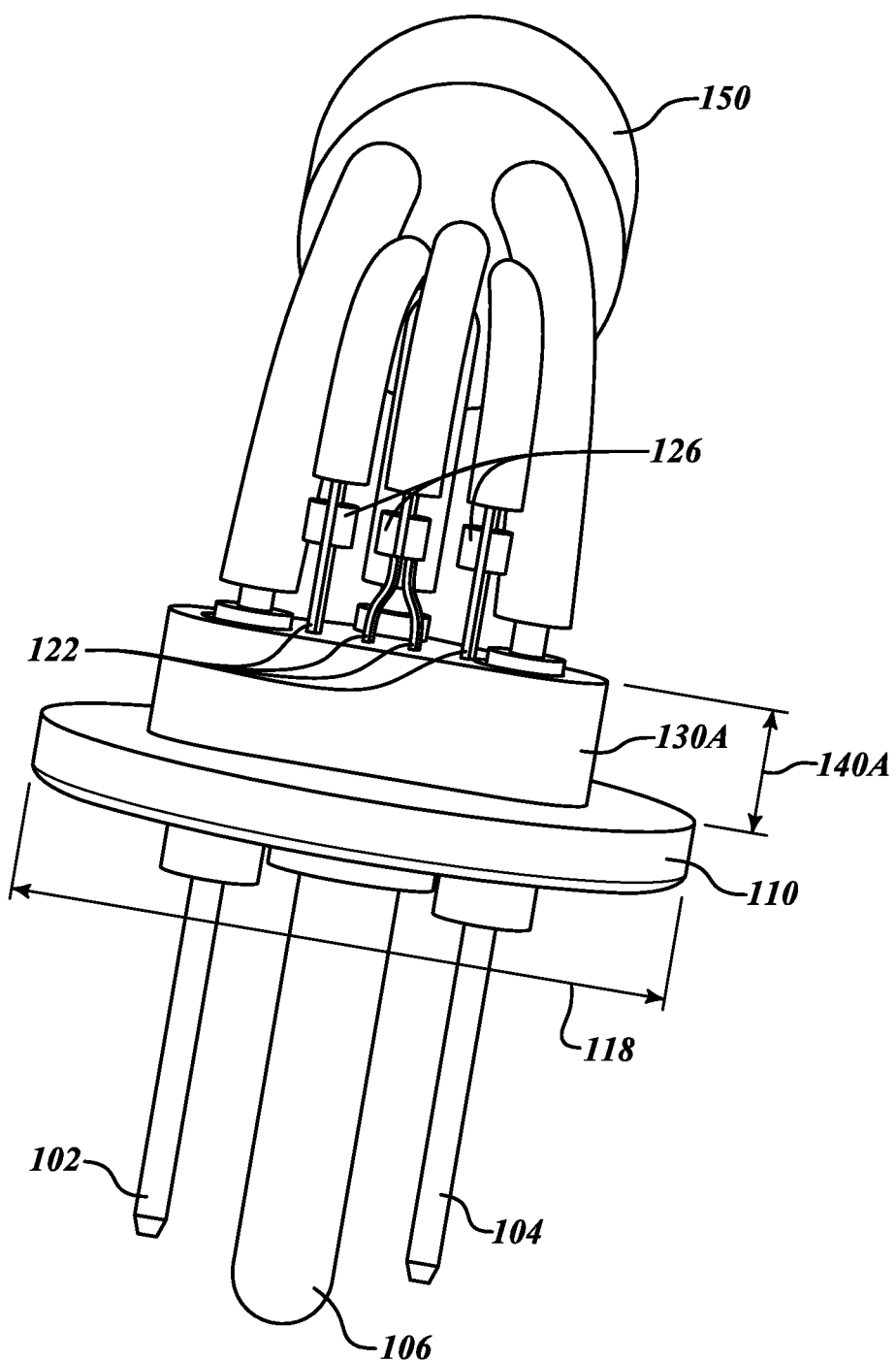
FIG. 8 illustrates an electrical plug including thermistors in accordance with another embodiment of the present disclosure.

FIG. 8 illustrates an assembling relationship of the housing 130A, the live pin 102, the neutral pin 104, the pin bridge 110, and the cable 150. The housing 130A may be attached to the back (inward facing) surface of the pin bridge 110 by fitting the live pin 102, the neutral pin 104, and the thermistors 120 into their corresponding receptacles 132A, 134A, 136A, and 138A. The electrodes 122 of the thermistors 120 may be connected to the corresponding data cords of the cable 150 by using the fastening member 126. The pins 102, 104, and 106 may be connected to the corresponding conductors of the cable 150.

After fitting the thermistors 120 into their corresponding receptacles 136A and 138A and connecting the electrodes 122 of the thermistors 120 to the corresponding data cords of the cable 150, a user can use any suitable thermally conductive adhesive or other material to fill in the thermistor receptacles 136A and 138A so as to maintain tight contact between the thermistors 120 and their corresponding receptacles 136A or 138A, thereby effectively reducing thermal resistivity and ensuring stable performance of the thermistors 120 during a predicted life time. By way of example and without limitation, the thermally conductive adhesive may be Dow Corning TC-2035 heat-resistance adhesive. It should be appreciated that the use of thermally conductive adhesive is merely illustrative, and the any other suitable materials and means may be used to achieve a tight, thermally conductive contact between the thermistors 120 and the corresponding receptacles 136A or 138A.

After fitting the live pin 102 and the neutral pin 104 into the corresponding receptacles 132A and 134A and connecting the pins 102 to the corresponding conductors of the cable 150, a user can solder the contact area between the pins and their respective receptacles so as to ensure a tight connection between the housing 130A and the pins 102 and 104 and significantly reduce thermal resistivity. It should be understood that soldering the contact area between the pins and the receptacles is merely illustrative, and that any other suitable means may be used to ensure a tight connection between the housing 130A and the pins 102 and 104. The subsequent assembling steps of forming the inner-mold 170 and the over-mold 180 may be the same as the ones described above with respect to the first exemplary embodiment of a housing 130.

Figure 9:
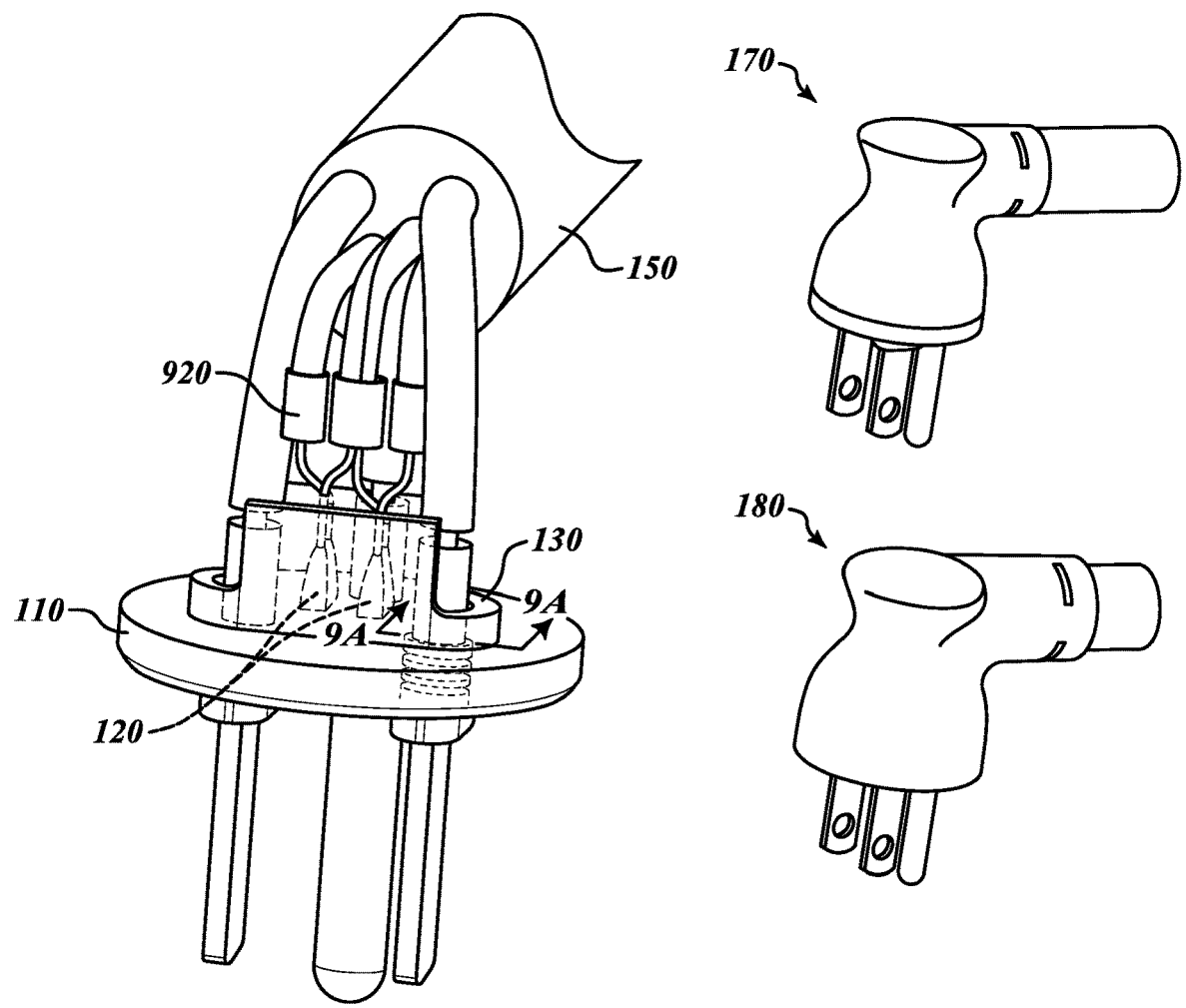
FIG. 9 illustrates a sealed electrical plug including thermistors in accordance with another embodiment of the present disclosure.

FIG. 9 illustrates an embodiment wherein two thermistors are situated in a single holder or housing 130. The thermistors 120 are disposed in a receptacle between receptacles for the live pin and neutral pin and are situated within the holder 130. The holder 130 secures the position of each thermistor and may attach to the bridge 110 and each of the metal pins. In the depicted embodiment, each thermistor is placed at the same or different positions relative to their respective pin. The thermistors 120 may also be disposed in a particular configuration on the bridge 110 to, for example, individually determine the temperature of each pin.

Data cords 166 are coupled to electrodes of each thermistor 120 to convey temperature to a controller. In an embodiment, tubing 920 surrounds the data cords 166 to provide insulation and protection. The tubing 920 may comprise heat-shrink tubes or any of a plurality of designs and compositions suited to particular plug configurations, uses, and embodiments. A cable 150, as discussed above, houses the data cords 166 and conductors, and electrically connects the electrical plug's various components. In an embodiment, an inner-mold 170 encases the inner portion of the electrical plug, including the thermistors 120, the housing, the terminal ends of the data cords and cable, and the tubing 920. An over-mold 180 surrounds the inner-mold 170, in accordance with various embodiments, and seals any open joint between the inner-mold 170 and the bridge 110.

Figure 9A:
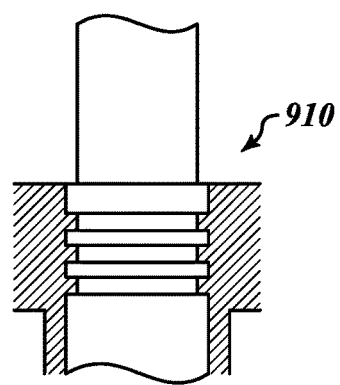
FIG. 9A further illustrates a pin seal as illustrated in FIG. 9.

In FIGS. 9 and 9A, a portion of the pins further comprise a plurality of grooves 910 to further assist in sealing the electrical plug. The combination of the pin grooves 910 and the holder 130 may form a tight, complementary seal against the passage of air, water, and/or other particles into the electrical plug. In an embodiment, the housing comprises a receptacle to receive the at least one pin, and may be molded around the pin, thereby filling the pin grooves 910 to create the seal. In an embodiment, molding may occur during the formation of the electrical plug. In one example, the housing may be positioned on the bridge and heated such that the holder material, e.g., a plastic, melts into the pin grooves 910, and forms a waterproof and/or airtight seal.

In another embodiment, the pins comprise a plurality of grooves positioned to mate with the bridge 110 and consequently form a tight seal between the external and internal sides of the plug. The bridge may be configured to receive a pin, and may be positioned such that when heated, the bridge material surrounding the pin melts into the pin grooves 910. Upon cooling, the components form a secure connection between the bridge 110 and metal pins. Additional embodiments for securing the pins to the bridge 110 and forming a tight seal between the external and internal portions of the electrical plug are described below with respect to FIGS. 13 and 14

It will be appreciated that the connection between the pin grooves and plug components may comprise any of a variety of designs to form a secure attachment and tight seal. Molding and/or mating of the pin grooves with the housing and/or bridge are not limited to the examples discussed above. Various designs may account for particular physical, chemical, and structural properties of the housing, pin, bridge, and plug materials, including but not limited to a material's thermal conductivity, electrical conductivity, magnetic properties, corrosivity, strength, and durability. Designs may further vary based on economic and/or manufacturing considerations regarding the materials of the plug components.

The depicted pin grooves 910 may comprise three evenly-spaced, distinct grooves surrounding the circumference of the pin, however the pin grooves are not limited to the depicted embodiments. The pins groves 910 may comprise any number of grooves, e.g., one, two, four or more, and any combination of groove shapes, sizes, and spacing to securely mate with the housing and/or bridge and form a tight seal. In addition, each pin may have the same or different pin groove 910 design.

Figure 10:
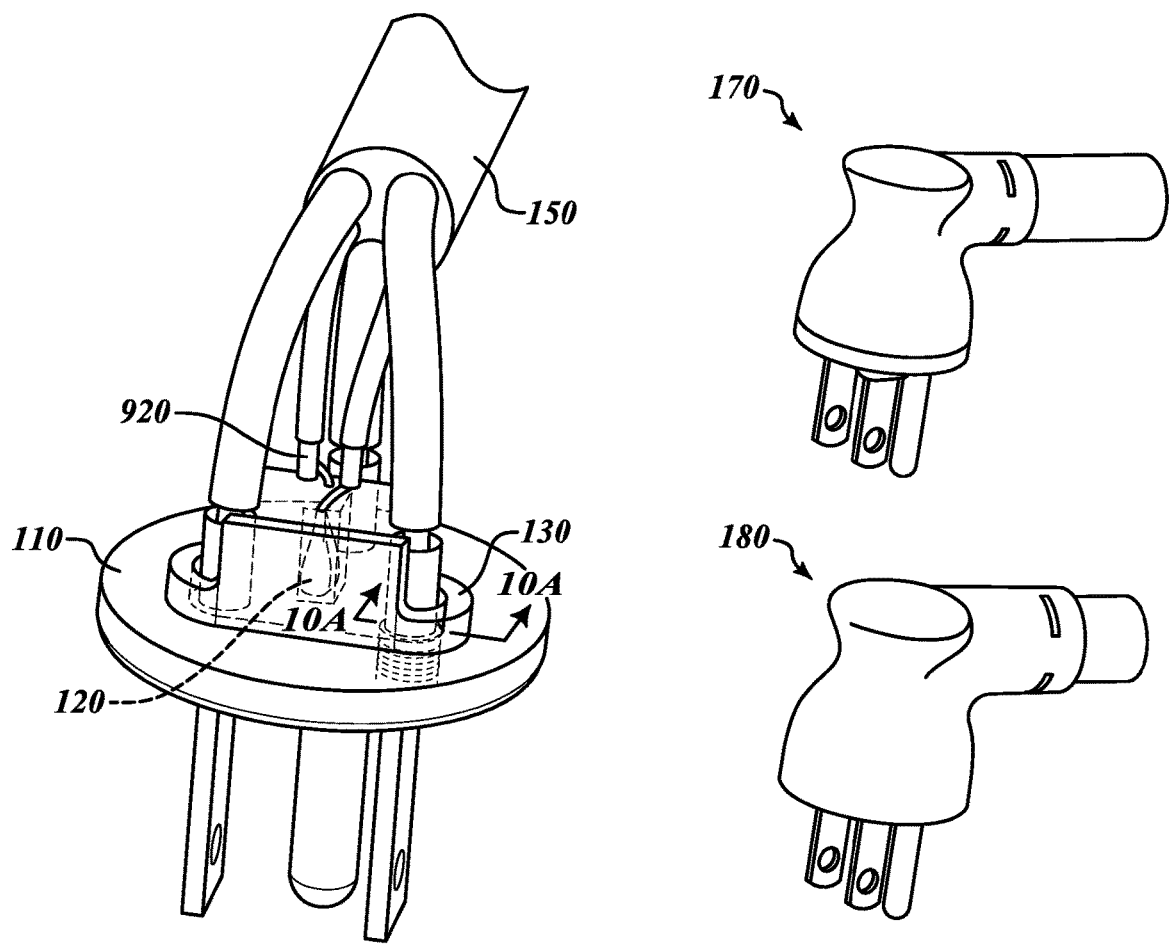
FIG. 10 illustrates a sealed electrical plug including a single thermistor in accordance with another embodiment of the present disclosure.
Figure 10A:
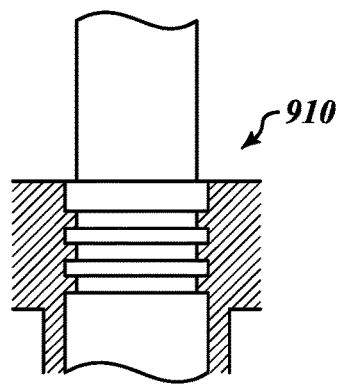
FIG. 10A further illustrates a pin seal as illustrated in FIG. 10.

FIG. 10 illustrates an embodiment of the present invention, positioning a single thermistor between the live pin and neutral pin. The holder 130 holds the thermistor in its position between the pins. This arrangement provides the ability to concurrently sense pin temperature. In an example, the sensed temperature indicates an overall temperature of the electrical plug, and/or provides a general estimated temperature of one or both pins. Such an arrangement can be particularly useful in applications that do not require a temperature for individual pins. Using a single thermistor may also reduce production costs, compared to embodiments having a plurality of thermistors.

Similar to the embodiment of FIGS. 9 and 9A, FIGS. 10 and 10A illustrate at least one pin having a plurality of pin grooves 910. As discussed above, the pins grooves 910 assist in securing the pin to the holder 130 and/or bridge 110. The pins grooves 910 work with either the holder 130 may form a seal, e.g., waterproof, airtight, etc., to prevent moisture and other particles from entering the interior of the plug. Significantly reducing and/or eliminating water and other particulates from the interior of the plug may improve the longevity of the plug and its components, reduce any potential electrical interference, and provide more accurate thermistor data and temperature readings.

Figure 11:
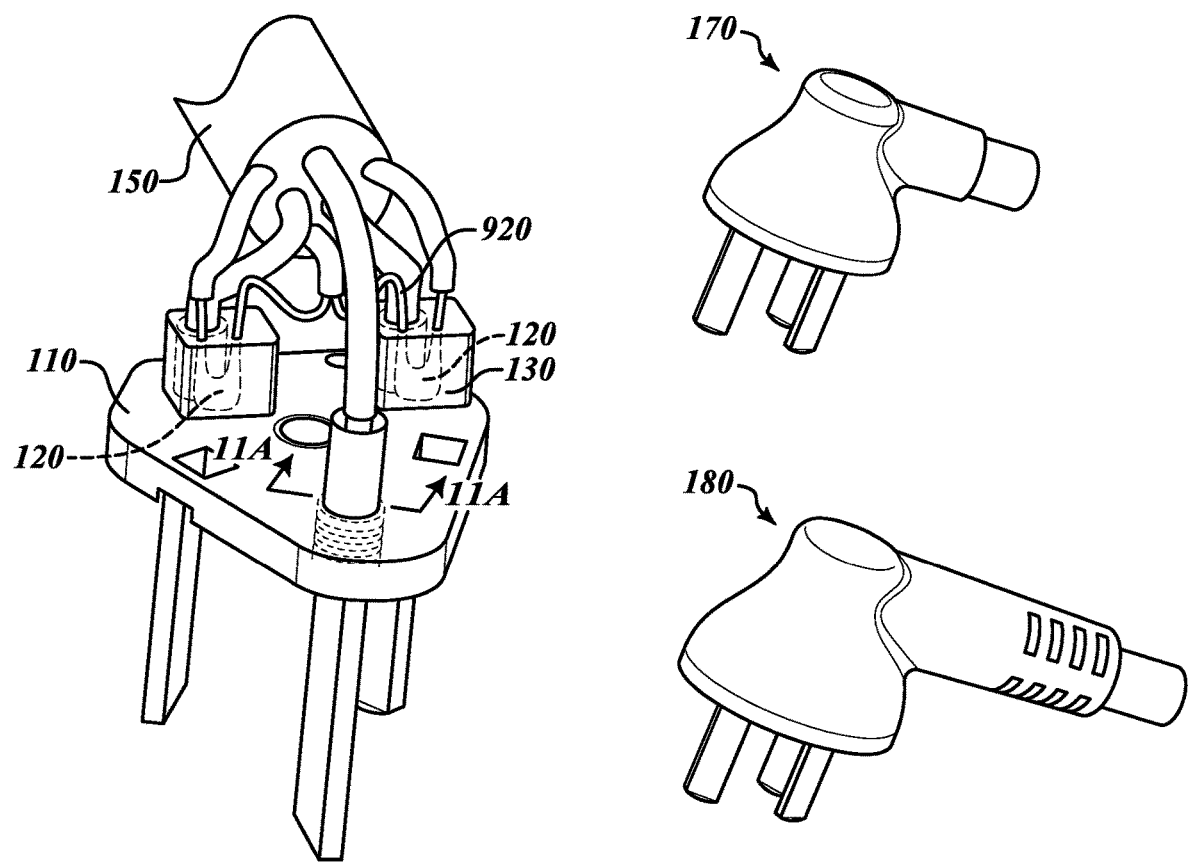
FIG. 11 illustrates a sealed electrical plug including thermistors in accordance with another embodiment of the present disclosure.

FIG. 11 illustrates an embodiment comprising two thermistors 120 installed within a single holder 130, with each thermistor adjacent to a pin. The thermistors 120 need not be placed between the pins, as in the embodiment of FIG. 9, but may instead be placed at any position adjacent to the pin. This arrangement allows for a greater variety of temperature determinations. For example, a single thermistor may be placed adjacent to each of the live pin and the neutral pin, thus allowing each pin's temperature to be individually sensed. Thermistor data can also be utilized to determine an overall temperature of the plug and/or an estimated temperature of both pins. As such, the present embodiment provides additional flexibilities and possibilities for temperature determinations and may be particular useful in electrical plug applications requiring both individual and collective temperature sensing.

Figure 11A:
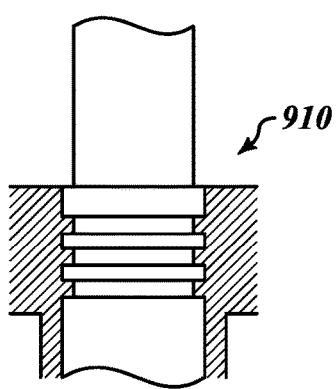
FIG. 11A further illustrates a pin seal as illustrated in FIG. 11.

In addition, the single holder containing both thermistors may provide unique advantages. A single holder may reduce manufacturing costs compared to embodiments which require multiple, separate holder units to hold each thermistor. In addition, the single holder unit can provide additional stability in maintaining thermistor positioning. For example, a single holder reduces the number of individually attached components on the bridge 110, and accordingly reduces the number the components that may become unsecured. Moreover, the holder 130 may attach to each pin via mating with the plurality of pin grooves 910, as discussed above and illustrated in FIG. 11A, to provide greater stability. Even if a section of the holder were to become unsecured, e.g., from a damaged attachment and/or defective adhesive, the pin groove 910 design would stabilize the holder through the attachment on one or both pins.

In addition to the single holder unit 130, FIG. 11 further depicts tubing 920, e.g., splice and heat-shrink, surrounding each of the thermistor data cords and each of the pin conduction elements consistent with embodiments discussed above. An inner-mold 170 surrounds the internal components for additional insulation and protection, and an over-mold 180 surrounds the inner-mold.

Figure 12:
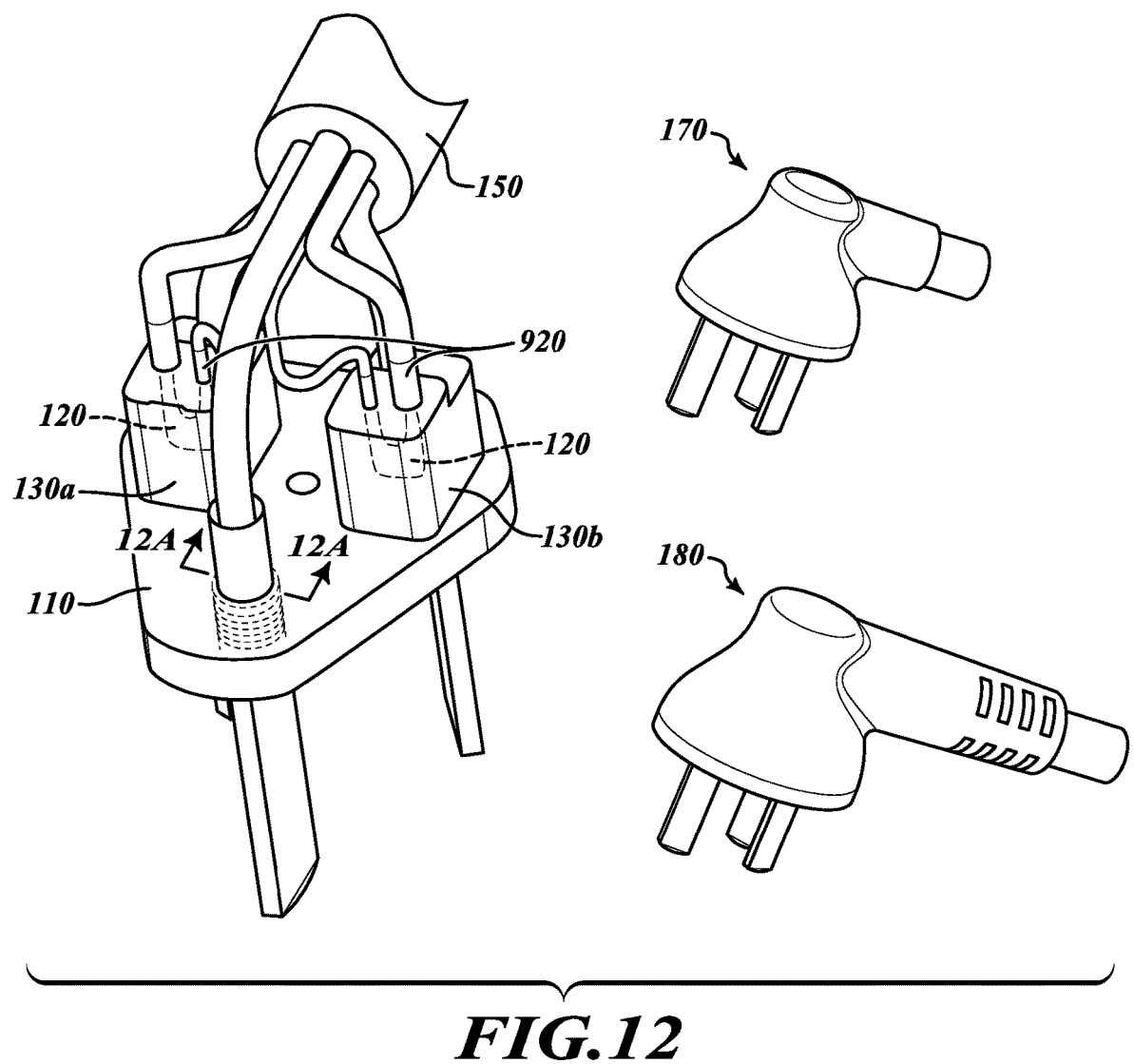
FIG. 12 illustrates a sealed electrical plug including thermistors in accordance with another embodiment of the present disclosure.
Figure 12A:
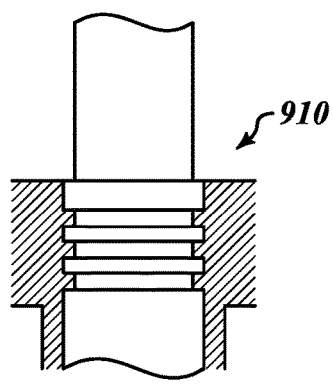
FIG. 12A further illustrates a pin seal as illustrated in FIG. 12.

FIGS. 12 and 12A depict another embodiment of the present invention, having two thermistors disposed in completely separate holder units 130a and 130b, and each holder unit connected to a pin via one or more pin grooves 910 on each pin. Similar to the embodiment of FIG. 11, multiple thermistors provides greater flexibility in temperature determinations. The temperature of one or both pins may be determined, and thermistor data for each pin may be taken together or separately.

An individual holder unit for each thermistor also increases flexibility with respect to the thermistor positioning. Since each thermistor is in a separate holder, its position relative to the pin may be at any desired position on the bridge 110. That is, the thermistor positions are not constrained to a particular configuration. For example, each thermistor may be placed at a position between the live pin and neutral pin of the electrical plug. In another example, only one thermistor is placed between the pins. Alternatively, each thermistor may be placed at a position adjacent to, and not between, each pin. Such flexibility may be desired for electrical plug applications requiring individual pin temperature determinations and/or temperature sensing at a particular location on the bridge 110.

Each holder 130 may attach to a pin via pin grooves 910 to stabilize positioning and to seal against moisture and particles from outside of the electrical plug. Pin grooves 910 may also be formed to secure the electrical plug with the bridge 110, and further prevent any potential moisture and particles from entering. In additional embodiments, each holder may have an adhesive on the surface adjacent to the bridge, in order to improve holder attachment and stability.

FIGS. 13, 13A, 13B, 13C, 14, 14A and 14B depict various methods and embodiments for creating a complementary seal between the pins and the bridge. As discussed above, the seal may assist in securing the pins to the bridge and preventing the passage of air, water, and/or other particles between the external and internal portions of the electrical plug.

Figure 13:
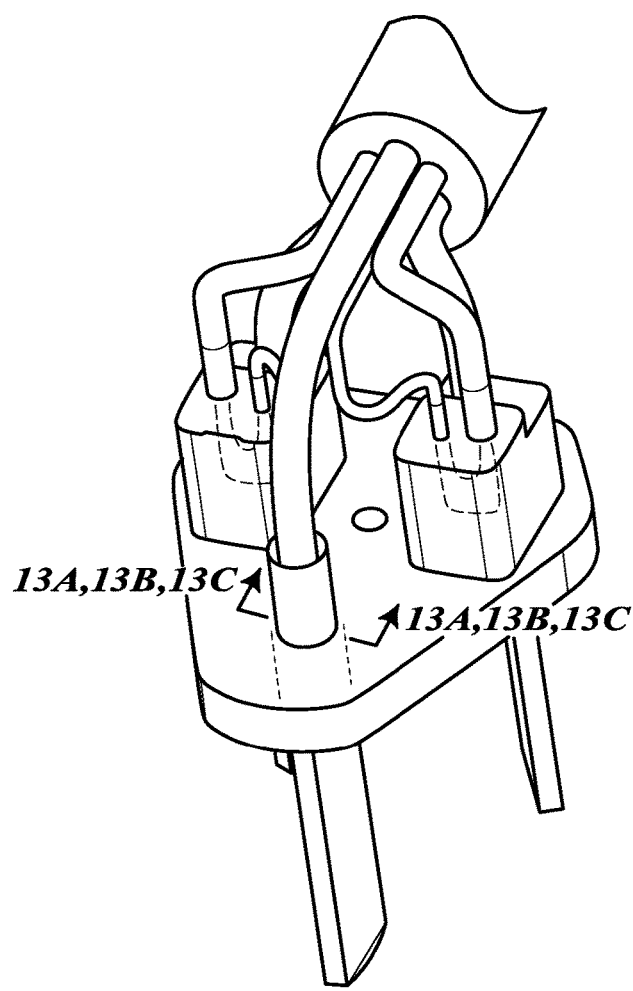
FIG. 13 illustrates various embodiments for creating a seal between one or more elements of an electrical plug, in accordance with the present disclosure.
Figure 13A:
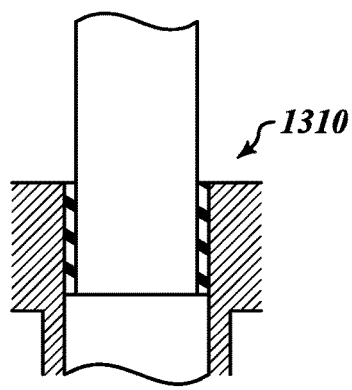
FIG. 13A further illustrates a first embodiment of a pin seal for the embodiment illustrated in FIG. 13.
Figure 13B:
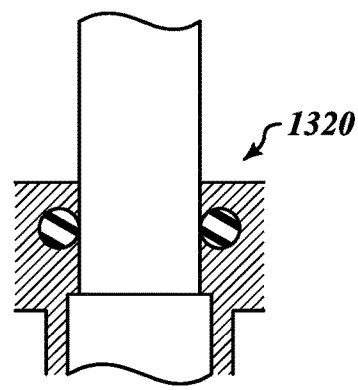
FIG. 13B further illustrates a second embodiment of a pin seal for the embodiment illustrated in FIG. 13.
Figure 13C:
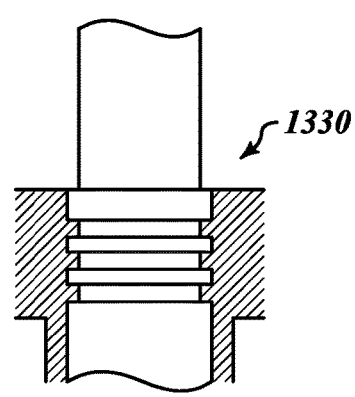
FIG. 13C further illustrates a third embodiment of a pin seal for the embodiment illustrated in FIG. 13.

In one embodiment 1310, illustrated in FIG. 13A, adhesive tape may be used to secure the pin to the bridge. The adhesive tape may be positioned around the circumference of the pin, similar to the pin groove embodiments, and assist in both sealing the external and internal bridge portions from air, moisture and particles, and securing the pin to the bridge. In another embodiment 1320, illustrated in FIG. 13B, a sealing ring, such as an O-ring, may be placed around a pin such that a seal is formed when the pin is positioned within the bridge. The depicted and described embodiments may be used individually and/or in combination with other sealing options, such as pin grooves or adhesive tape. For example, in a further embodiment 1330, illustrated in FIG. 13C, pin grooves may be used with or without the adhesive and/or sealing ring features. In a further embodiment, embedded injection material may be used to mate and seal the pins grooves and bridge, such as LSR (liquid silicon rubber), TPE etc.

Figure 14:
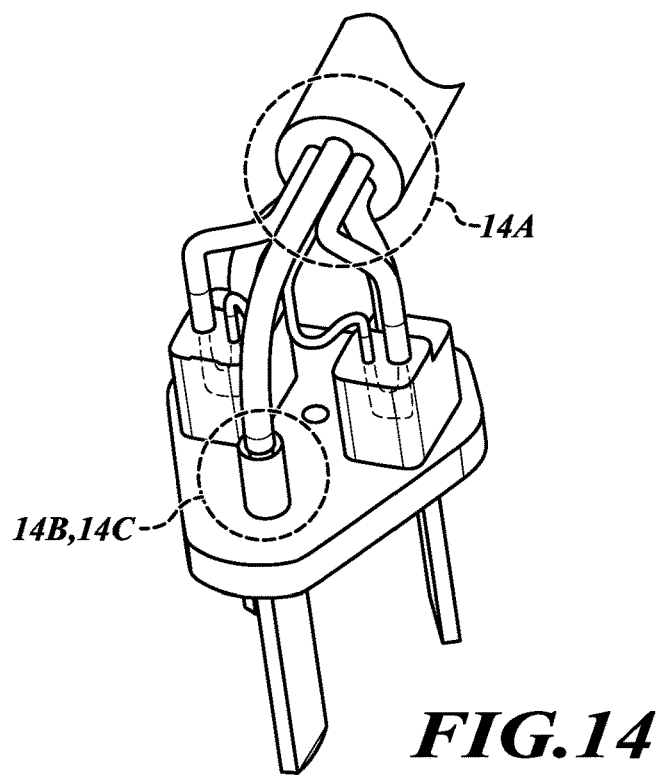
FIG. 14 illustrates additional embodiments for creating a seal between one or more elements of an electrical plug in accordance with the present disclosure.

FIG. 14 depicts additional embodiments for sealing the electrical plug, with respect to the pins and other elements, such as cables, from air, moisture and particles. As previously described and depicted, one or more cables, e.g., data cords and pin conductors, may be coupled to the pins, electrodes, and other elements within the electrical plug. Tubing may surround the cables to provide insulation and protection, and may comprise a variety of designs and compositions, depending on the purpose of the cable. In the embodiments of FIG. 14, various embodiments for sealing the internal elements of the electrical plug are depicted. Similar to the sealing options discussed above with respect to FIG. 13, the present embodiments may be configured to prevent the passage of moisture, air, dust, and other particles.

Figure 14A:
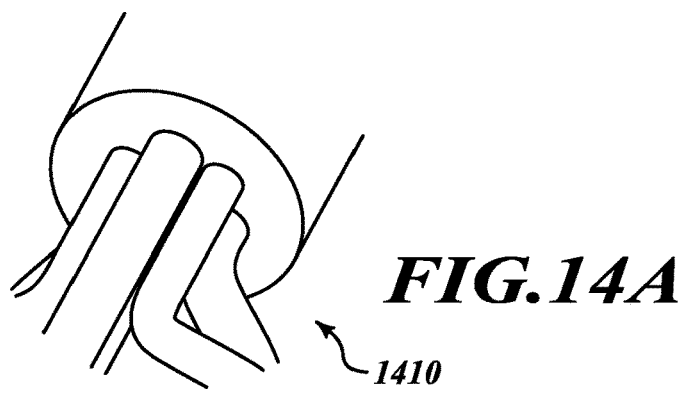
FIG. 14A further illustrates seal between cable tubing and wire insulation as illustrated in FIG. 14.
Figure 14B:
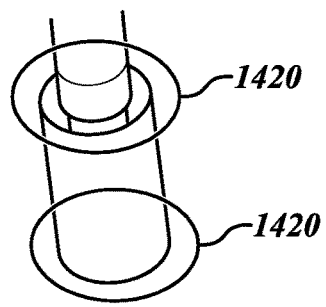
FIG. 14B further illustrates a first embodiment of a pin seal for the embodiment illustrated in FIG. 14.
Figure 14C:
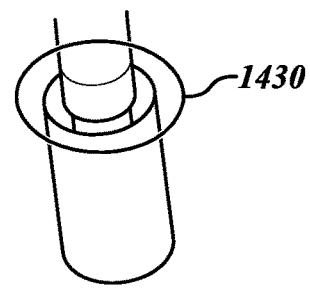
FIG. 14C further illustrates a second embodiment of a pin seal for the embodiment illustrated in FIG. 14.

In a first embodiment 1410, illustrated in FIG. 14A, an adhesive may be applied to cable tubing to form an attachment and seal between the cable tubing and wire insulation. An epoxy molding may alternatively used. The adhesive and sealing mechanism may be similar to the sealing method discussed above between the pin and the bridge 1310. In another embodiment 1420, illustrated in FIG. 14B, the wire conductor and insulation may be crimped together to form a seal. An adhesive may then be applied to the crimped portion between the conductor and insulation to form a stronger seal. Similarly, an adhesive may be applied to the root of the bins at the junction with the bridge for additional stability and security. In yet another embodiment 1430, illustrated in FIG. 14C, tin may be soldered onto the wire conductor after crimping the wire insulation and cable tubing together. In a further embodiment, small portions (i.e., window) may be cut from the insulation around the wire cores of the wire conductors and an adhesive or epoxy or molding may be applied around the wire conductors so as to wrap around the wire conductors and the cable jack and flow into the windows and any gap between the insulation cores and the jacket to form a seal between the cable tubing and the wire insulation.

It will be appreciated that the sealing methods discussed in FIGS. 13 and 14 are not limited to the depicted embodiments, and any such sealing methods may be applied to form a seal and/or attachment between various elements of the plug, e.g., pins, bridge, cables, cable tubing, wire insulation, housing, and thermistors. While certain embodiments have been described, these embodiments have been presented by way of example only, and are not intended to limit the scope of the inventions disclosed herein. For instance, depending on various plug types, number of temperature sensors, such as thermistors, embedded in an electrical plug, configuration of the housing containing the temperature sensors, and the process for assembling the electrical plug may have variants without departing from the spirit of the present disclosure. Indeed, the present disclosure described herein may be embodied in a variety of other forms; furthermore, various omissions, substitutions, and changes in the form of the embodiments described herein may be made without departing from the spirit of the inventions disclosed herein. The accompanying claims and their equivalents are intended to cover such forms or modifications as would fall within the scope and spirit of certain of the inventions disclosed herein.

What is claimed:

1. A sealed electrical plug, comprising:
    two or more pins comprising a live pin including a first plurality of grooves formed around the live pin and a neutral pin including a second plurality of grooves formed around the neutral pin;
    a bridge through which the two or more pins extend;
    a first temperature sensor for monitoring an internal temperature of the live pin, wherein the first temperature sensor is positioned on the bridge adjacent to the live pin, and a second temperature sensor for monitoring an internal temperature of the neutral pin, wherein the second temperature sensor is positioned on the bridge adjacent to the neutral pin;
    first housing for holding the first temperature sensor in a first position on an inward facing surface of the bridge and configured to receive the live pin;
    a second housing for holding the second temperature sensor in a second position on the inward facing surface of the bridge and configured to receive the neutral pin;
    a first seal formed between the first plurality of grooves and the first housing, and a second seal formed between the second plurality of grooves and the second housing, wherein the first seal is formed by molding a material of the bridge to fill the first plurality of grooves, wherein the second seal is formed by molding the material of the bridge to fill the second plurality of grooves, wherein the first seal seals a passage between the live pin and the bridge to at least one of air and water, and the second seal seals a passage between the neutral pin and the bridge to at least one of air and water;
    a cable including a first conductor configured to be connected together with the live pin at a first connected portion and a second conductor configured to be connected together with the neutral pin at a second connected portion, a first data cable for conveying data from the first temperature sensor and a second data cable for conveying data from the second temperature sensor;
    a first complementary seal between the live pin and the bridge formed by a first adhesive applied around a circumference of the live pin at the first connected portion and a first tubing surrounding the first adhesive;

a second complementary seal between the neutral pin and the bridge formed by a second adhesive applied around a circumference of the neutral pin at the second connected portion and a second tubing surrounding the second adhesive;

an inner-mold covering the first and second temperature sensors, the inward facing surface of the bridge and the first and second complementary seals, and the first and second housing; and an outer-mold covering the inner-mold.

2. The sealed electrical plug of claim 1, wherein each of the first temperature sensor and the second temperature sensor is a thermistor or an integrated circuit chip.

3. The sealed electrical plug of claim 1, wherein each of the first housing and the second housing is formed of a thermally conductive material.

4. The sealed electrical plug of claim 1, further comprising a third seal formed between the cable and the inner-mold.

5. A method of assembling a sealed electrical plug having two or more pins, comprising:

positioning a first temperature sensor on an inward facing surface of a bridge adjacent to a live pin among the two or more pins and placing a second temperature sensor on the inward facing surface of the bridge adjacent a neutral pin among the two or more pins, the live pin extending through the bridge and including a first plurality of grooves formed around the live pin, the neutral pin extending through the bridge and including a second plurality of grooves formed around the neutral pin, the first temperature sensor configured to monitor an internal temperature of the live pin and the second temperature sensor configured to monitor an internal temperature of the neutral pin;

holding the first temperature sensor in a first position on the bridge using a first housing configured to receive the live pin and holding the second temperature sensor in a second position on the bridge using a second housing configured to receive the neutral pin;

forming a first seal between the first plurality of grooves and the first housing by molding a material of the bridge to fill the first plurality of grooves;

forming a second seal between the second plurality of grooves and the second housing by molding the material of the bridge to fill the second plurality of grooves;

connecting the live pin to a first conductor by connecting the live pin to the first conductor at a first connected portion;

connecting the neutral pin to a second conductor by connecting the neutral pin to the second conductor at a second connected portion;

forming a first complementary seal between the live pin and the bridge formed by a first adhesive applied around a circumference of the live pin at the first connected portion and a first tubing surrounding the first adhesive;

forming a second complementary seal between the neutral pin and the bridge formed by a second adhesive applied around a circumference of the neutral pin at the second connected portion and a second tubing surrounding the second adhesive;

connecting the first temperature sensor to a first data cable and connecting the second temperature sensor to a second data cable;

forming an inner-mold covering the first and second temperature sensors, the inward facing surface of the bridge and the first and second complementary seals, and the first and second housing; and an outer-mold covering the inner-mold.

6. The plug of claim 1, wherein first tubing surrounds the first data cable and second tubing surrounds the second data cable for insulation and protection.

7. The plug of claim 1, wherein the first housing is separate from the second housing.

8. The sealed electrical plug of claim 1, wherein the first housing has an elongated shape and further comprises a first pin receptacle for receiving an end of the live pin and wherein the second housing has the elongated shaped and further comprises a second pin receptacle for receiving an end of the neutral pin and each of the first housing and the second housing includes at least one temperature sensor receptacle for receiving the first and second temperature sensor.

9. The sealed electrical plug of claim 8, wherein the at least one temperature sensor receptacle is disposed in an approximate line between the first pin receptacle and the second pin receptacle.

10. The sealed electrical plug of claim 9, further comprising a thermally conductive adhesive filled into a gap between the at least one temperature sensor receptacle and the first and second temperature sensor.

11. The sealed electrical plug of claim 1, wherein each of the first housing and the second housing comprises a cover portion, a hinge portion, and a base portion.

12. The sealed electrical plug of claim 11, wherein each of the first housing and the second housing further comprises at least one first connecting member for removably joining the cover portion and the base portion together.

13. The sealed electrical plug of claim 12, wherein the at least one first connecting member comprises a protruding part and a first receptacle, the protruding part being configured to removably fit into the first receptacle.

14. The sealed electrical plug of claim 12, further comprising a second connecting member for removably attaching the at least one housing to the bridge.

15. The sealed electrical plug of claim 14, wherein the second connecting member comprises a pair of cantilevers formed on the housing and a second receptacle formed on the pin bridge, the pair of cantilevers configured to removably engage the second receptacle.

16. The plug of claim 1 or method of claim 5, wherein each of the first temperature sensor and the second temperature sensor is a thermistor or an integrated circuit chip.

17. The method of claim 5, wherein the first and second housing are formed of a thermally conductive ceramic.

18. The method of claim 5, wherein first tubing surrounds the first data cable and second tubing surrounds the second data cable for insulation and protection.

19. The method of claim 5, wherein the first housing is separate from the second housing.

* * * * *